C. O. HENDERSON.
WEED DIGGING MACHINE.
APPLICATION FILED DEC. 27, 1912.
1,147,241.
Patented July 20, 1915.
2 SHEETS—SHEET 1.
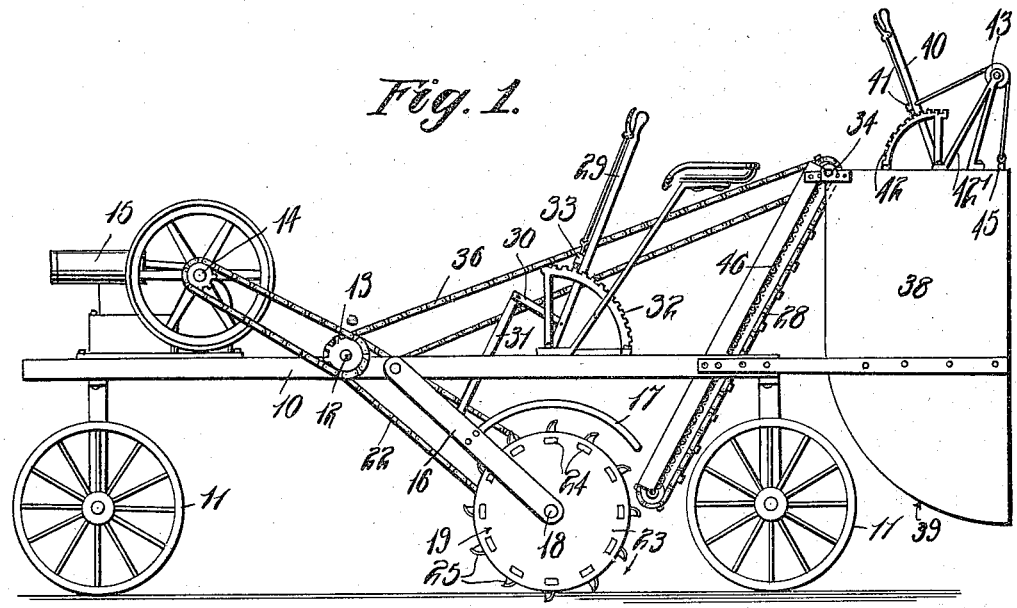
Fig. 1.
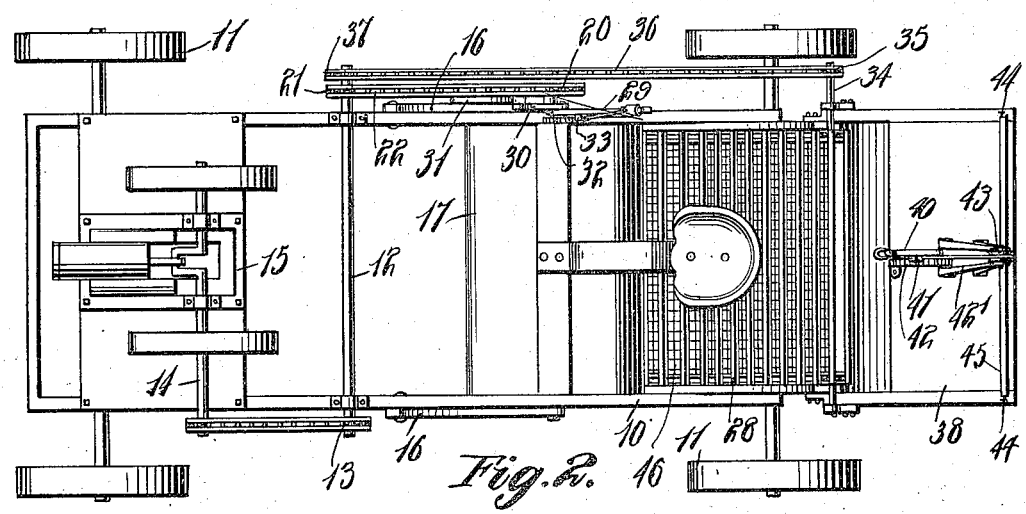
Fig. 2.
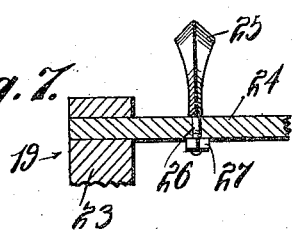
Fig. 7.
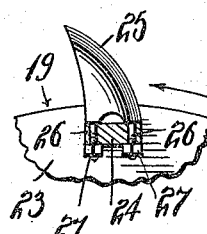
Fig. 8.
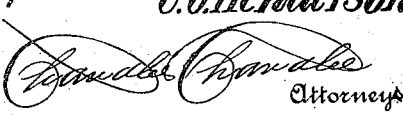
Witnesses
Inventor
C. O. Henderson,
By
Attorneys

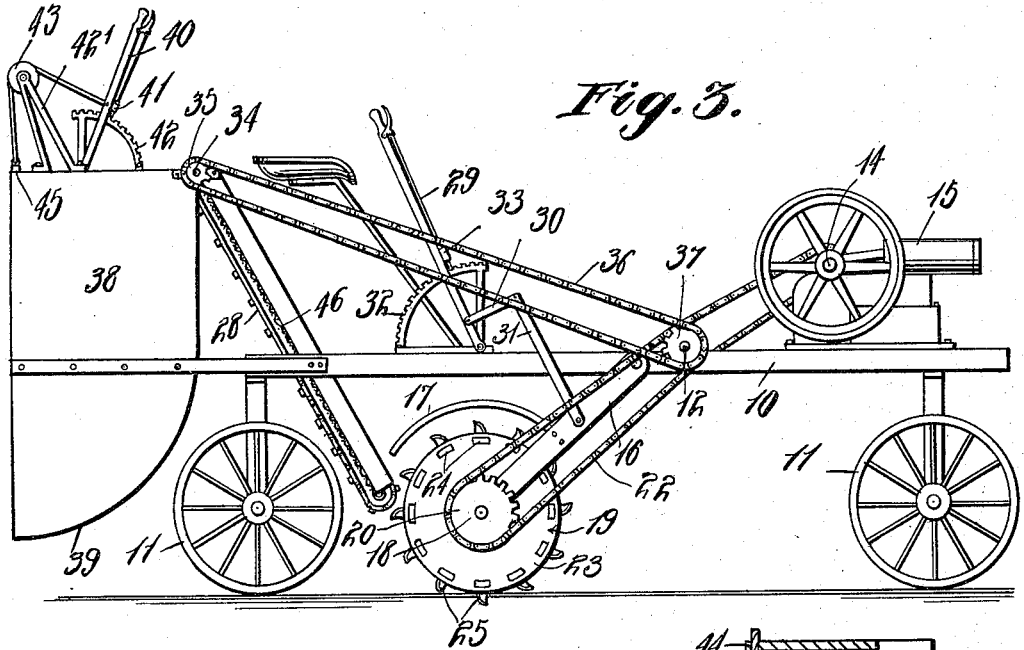
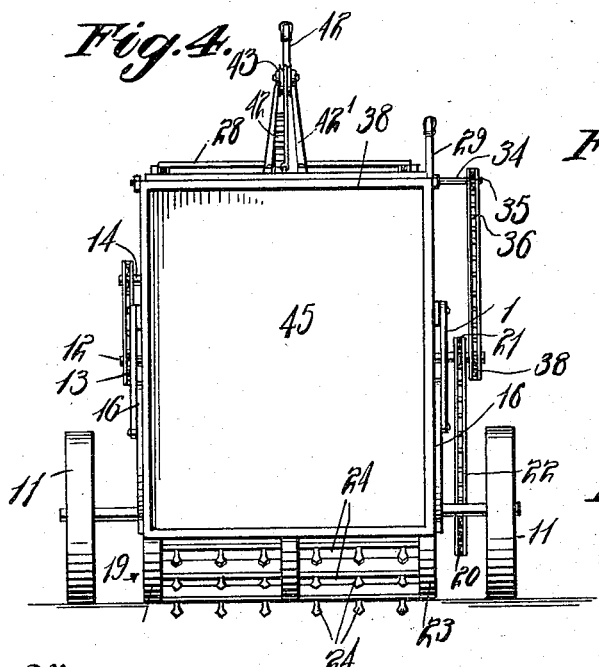
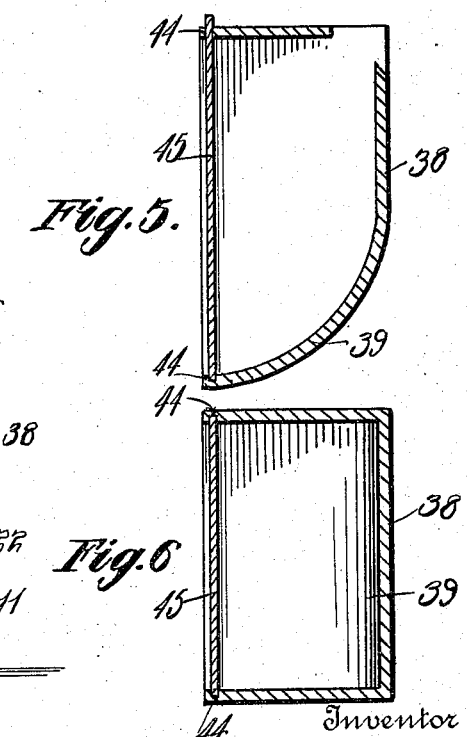

UNITED STATES PATENT OFFICE.

CARL O. HENDERSON, OF SPOONER, WISCONSIN.

WEED-DIGGING MACHINE.

1,147,241.  Specification of Letters Patent.  Patented July 20, 1915.

Application filed December 27, 1912. Serial No. 738,908.

*To all whom it may concern:*

Be it known that I, CARL O. HENDERSON, a citizen of the United States, residing at Spooner, in the county of Washburn, State of Wisconsin, have invented certain new and useful Improvements in Weed-Digging Machines; and I do hereby declare the following to be a full, clear, and exact description of the invention, such as will enable others skilled in the art to which it appertains to make and use the same.

This invention relates to improvements in weed digging machines.

The principal object of the invention is to provide a simple device of this character in which the weeds are dug up and conveyed to a suitable hopper.

Another object is to provide a device of this character from which the collected weeds may be quickly and easily removed from the hopper.

Other objects and advantages will be apparent from the following description and with particular reference to the accompanying drawings.

In the drawings: Figure 1 is a side elevation of a machine made in accordance with my invention, Fig. 2 is a top plan view, Fig. 3 is a side elevation of the machine taken from the opposite side from that of Fig. 1, and Fig. 4 is a rear elevation of the machine, Fig. 5 is a vertical longitudinal sectional view through the hopper, Fig. 6 is a horizontal transverse sectional view through the hopper, Fig. 7 is an enlarged fragmentary section of the digging device, and Fig. 8 is an enlarged fragmentary cross section of the same.

Referring particularly to the accompanying drawings, 10 represents a frame suitably supported by the wheels 11, the machine being adapted to be drawn by means of horses, or may be motor driven. Mounted transversely of the frame 10 is a shaft 12, said shaft having on one end a sprocket wheel 13 which receives power from the shaft 14 of the engine 15, said engine being located on the forward portion of the frame. This engine is preferably of the gas or gasolene type, and if desired, may be geared to the wheels 11 to propel the machine.

Pivotally mounted on the frame 10, and extending below the frame is a swinging frame which comprises the side arms 16 to which is secured a rearwardly extending curved guide plate 17. Journaled in the lower ends of the arms 16 are the trunnions 18 of the drum 19 which drum forms the digging element of the machine. On one of the trunnions is a sprocket wheel 20 and on the other end of the shaft 12 is a sprocket 21 to transmit motion to the drum by means of the chain 22.

The drum comprises the end disks 23, connected by the bars 24, and attached to the bars are the digger teeth 25, these digger teeth having the threaded stems 26 which pass through openings in the bars 24, and are secured by means of the clamping nuts 27. In the rear portion of the frame, inclining upwardly and rearwardly is a conveyer belt 28, which lifts the weeds and the earth which are dug by means of the teeth 25 of the drum, the screen 46 sifting the soil. Pivotally mounted on one end of the frame near the drum is a vertical lever 29, this lever having upwardly extending arms 30 to which is pivotally connected a link 31 the opposite end of said link being pivotally connected to one of the arms 16 of the swinging frame. The rack segment 32 is also mounted on this frame, and is adapted to be engaged by the pawl 33 of the lever 29. By means of the lever 29, the swinging frame may be raised and lowered to move the drum toward and away from the ground.

The shaft 34 of the upper rollers of the conveyer 28 is provided with a sprocket 35, to receive power by means of a chain 36 from a sprocket 37 on the end of the shaft 12 next to the before-mentioned sprocket 21. Thus the drum and the elevator belt are simultaneously driven from the shaft.

Mounted on the rear of the frame adjacent the upper discharge end of the elevator 28 is a hopper 38, said hopper having its lower end downwardly and rearwardly curved as indicated at 39, so as to permit the material gathered therein to be easily and quickly discharged when the rear of the hopper is opened as will be described later. Pivotally mounted on the top of the hopper is a vertical lever 40, said lever carrying a pivoted pawl 41 for engagement with the teeth of the rack segment 42. Mounted adjacent the lever 40 and having its upper end extending above the rear edge of the hopper 38 is a bracket 42', the upper or outer end of the bracket being provided with a grooved roller 43. In the rear edges of the side walls of the hoppers are formed the vertical guiding grooves 44, and slidable in these grooves is a vertically movable door 45, a chain being secured at one end to the upper end of the door 45 and passing over the roller 43 with its other end secured to the lever 40. When the lever is moved toward the forward end of the machine, the chain is pulled to raise the door, and permit the material in the hopper to slide from the opening in the rear on the curved inclined bottom 39. Below the conveyer belt 28 is a screen 46, which sifts the earth from the grass as it is conveyed to the hopper.

What is claimed is:

A weed digging machine including a wheel supported frame, a pair of arms pivotally secured to the sides of the frame and extending downwardly and rearwardly, a rotating toothed drum mounted in the lower ends of the arms, a curved guiding plate rigidly secured to the arms and spaced above the drum concentrically therewith, an upwardly and rearwardly extending conveyer mounted in the frame and having its lower end disposed adjacent the rear end of the plate, and means for raising and lowering the arms and attached drum and plate.

In testimony whereof, I affix my signature, in the presence of two witnesses.

CARL O. HENDERSON.

Witnesses:
 GEO. W. HARMON,
 BRUCE FLEMING.

Copies of this patent may be obtained for five cents each, by addressing the "Commissioner of Patents, Washington, D. C."